United States Patent [19]

Takahashi

[11] Patent Number: 4,602,312

[45] Date of Patent: Jul. 22, 1986

[54] CONTROL BUS DEVICE

[75] Inventor: Masaru Takahashi, Gifu, Japan

[73] Assignee: Mitsubishi Denki Kabushiki Kaisha, Tokyo, Japan

[21] Appl. No.: 611,181

[22] Filed: May 17, 1984

[30] Foreign Application Priority Data

May 31, 1983 [JP] Japan .................................. 58-96263

[51] Int. Cl.⁴ ............................................ H02B 13/02
[52] U.S. Cl. .................................... 361/342; 361/341; 361/361; 361/391
[58] Field of Search ............................ 174/68 B, 70 B; 339/22 B; 361/334, 341, 342, 355, 361, 378, 372, 390, 391, 426

[56] References Cited

U.S. PATENT DOCUMENTS 3,469,149 9/1969 Paape ..................................... 361/334
4,199,655 4/1980 Shariff et al. ......................... 361/334
4,316,234 2/1982 Takagi et al. ......................... 361/342

Primary Examiner—A. D. Pellinen
Assistant Examiner—Gregory P. Thompson
Attorney, Agent, or Firm—Oblon, Fisher, Spivak, McClelland & Maier

[57] ABSTRACT

A control bus device comprises bus conductors for a control circuit being common to a plurality of control units which are arranged in a multistage to form a control center. A plurality of conducting bars each having connecting points for branch lines are arranged between first and second insulating cases; a connecting means is formed either or both the first and second insulating cases to connect them in a detachable manner and when the first and second insulating cases are assembled, the conducting bars secured at predetermined positions by legs formed in the second insulating case.

8 Claims, 8 Drawing Figures 4,602,312

CONTROL BUS DEVICE

BACKGROUND OF THE INVENTION

1. Field of the Invention

The present invention relates to a control bus device. More particularly, it relates to a control bus device to be arranged in a casing for an apparatus such as a control center in which a plurality of control units are arranged in a multistage in the casing and to be used as bus conductors for a controlling circuit common to be control units.

2. Description of Prior Art

In many cases, a plurality of control units arranged in a multistage in a casing to constitute a control center have a single control circuit being common to these control units, the control circuit including a power circuit, an alarm circuit and so on, on account of which a control bus device is used to simplify cross-wiring for each of the control units. In this case, it is desirable for the control bus device to be small in size and to require only a small space because the inner space of the control center should be compact. Further, the control bus device should facilitate wiring for branch lines to the control units.

SUMMARY OF THE INVENTION

It is an object of the present invention to provide a control bus device suitable for use in a compact control center to achieve the advantage of being small as mentioned above.

The foregoing and the other objects of the present invention have been attained by providing a control bus device comprising bus conductors for a control circuit being common to a plurality of control units which are arranged in a multistage in a casing for a control center which comprises conducting bars each having connecting points for branch lines spaced at a predetermined distance, a first insulating case comprising a plurality of laterally arranged grooves each receiving therein each of said conducting bars and each having two side walls extending as insulating barriers and a second insulating case comprising a plurality of sections corresponding to the grooves of the first insulating case each having two legs which extend along the inner surfaces of said side walls and have their free ends reaching said conducting bar when said first and second insulating cases are coupled and a connecting means being connectable and disconnectable of said first and second insulating cases.

DETAILED DESCRIPTION OF PREFERRED EMBODIMENTS

Preferred embodiments of the present invention will be described with reference to drawings.

Figure 1:
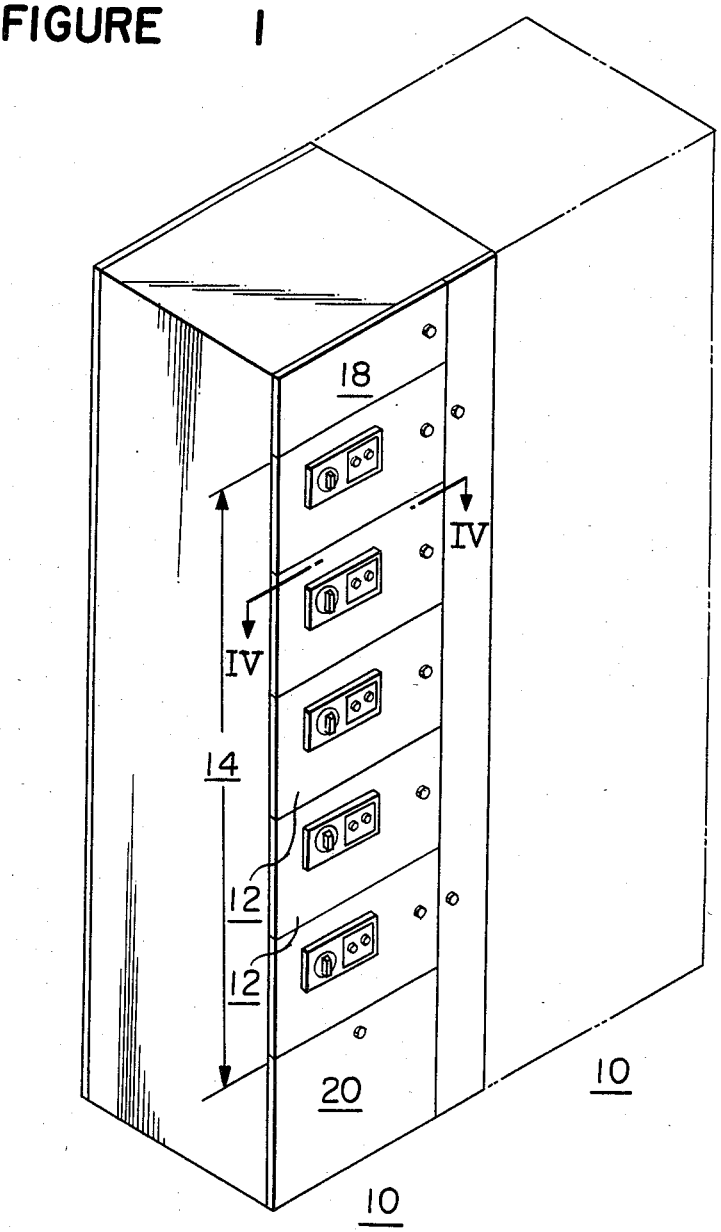
FIG. 1 is a perspective view of a control center applicable to the present invention.
Figure 2:
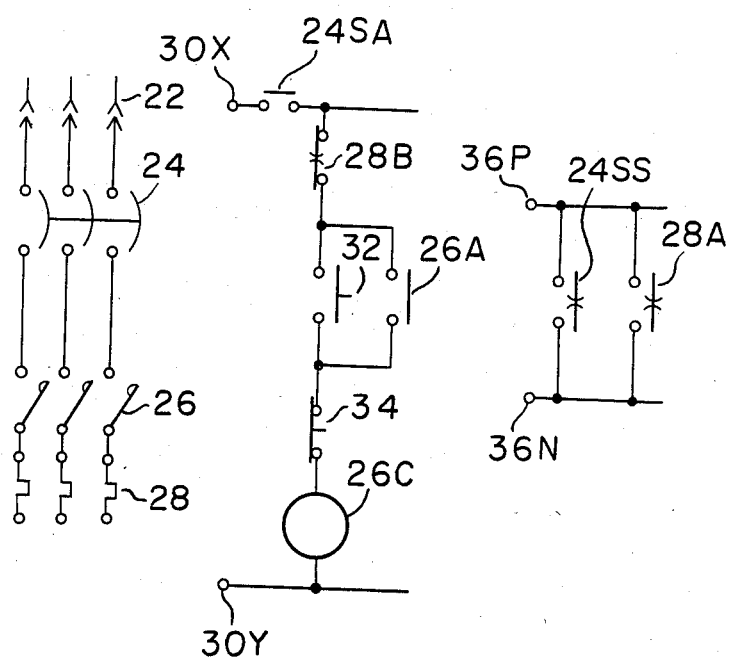
FIG. 2 is a circuit diagram of a control unit held in the control center.

FIG. 1 shows the outline of a control center 10 to which the present invention is applied. Generally, a number of the control centers are placed laterally in a row and each of the control center 10 comprises a control unit section 14 receiving therein a plurality of typical control units 12 arranged in a multistage, a vertical wiring section 16, a horizontal bus conductor section 18 and a general terminal block section 20. FIG. 2 shows an example of the circuit diagram of the control units 12 in which a main circuit is constituted by connecting in series a plug-in connector 22, a line disconnecting device 24, an electromagnetic switch 26 and a thermal relay 28 in the order. Between terminals 30X and 30Y for a power source for the control circuit being common to each of the control units, connected is an OFF contact 28B for opening at the tripped position of the thermal relay 28, an ON push-button 32, an OFF push-button 34 and a coil 26C of the electromagnetic switch 26 in series in the order through an auxiliary contact 24SA actuated in association with the on-off operations of the line disconnecting device 24. A self-holding contact 26A of the electromagnetic switch 26 is connected in parallel to the ON push-button 32. In FIG. 2, external push buttons and a signal lamp are omitted for simplification of the Figure. A contact 24SS for closing at the trip position of the line disconnecting device is connected between terminals 36P and 36N of the alarm circuit in parallel to a contact 28A for closing at the trip position of the thermal relay. The terminals 36P and 36N of each of the control units arranged in a multistage in the casing of the control center 10 are connected in parallel and are connected as a group to the alarm circuit.

Figure 3:
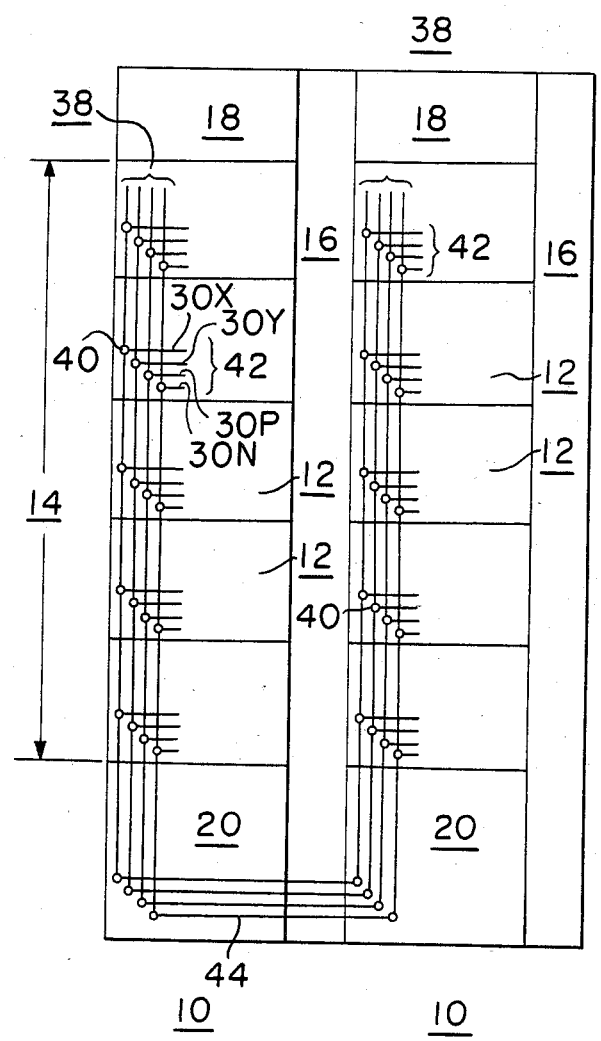
FIG. 3 is a circuit diagram of a control circuit for the control center of FIG. 1.

FIG. 3 shows arrangement of cross-wirings of each of the terminals 30X, 30Y, 36P and 36N shown in FIG. 2. In FIG. 3, the same reference numerals as in FIG. 1 designate the same parts. In a control bus device 38 comprising a plurality of bus conductors which extend vertically along the control unit section 14, connecting points 40 are provided corresponding to each of the control units 12 and branch lines 42 extend from the connecting points to the respective control units 12. In this embodiment, the number of the branch lines 42 is four for the terminals 30X, 30Y, 36P and 36N and the vertical control bus devices 38 of the control centers 10 are connected by cross-wirings 44.

Figure 4:
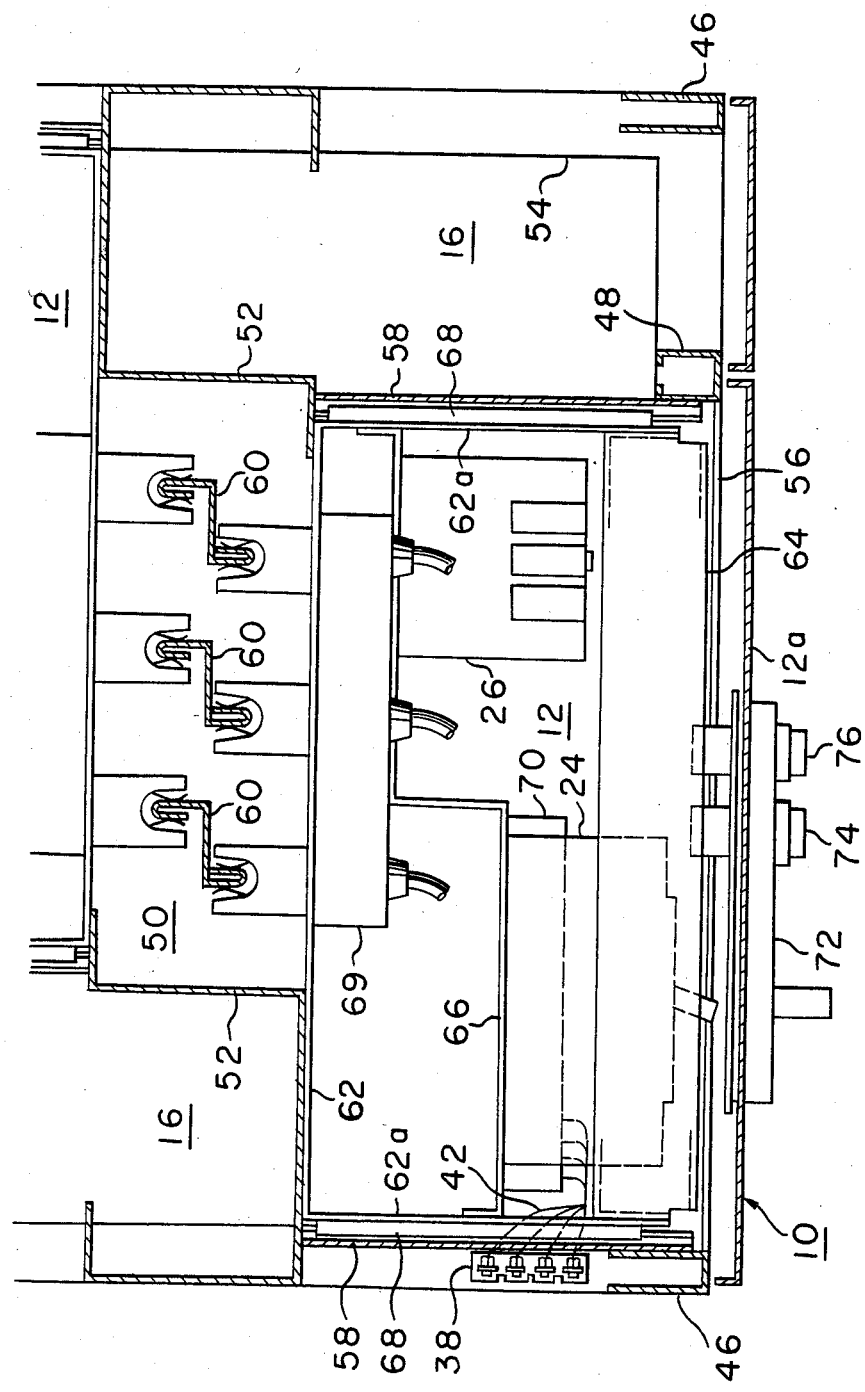
FIG. 4 is an enlarged cross sectional view taken along the line IV—IV in FIG. 1.
Figure 5:
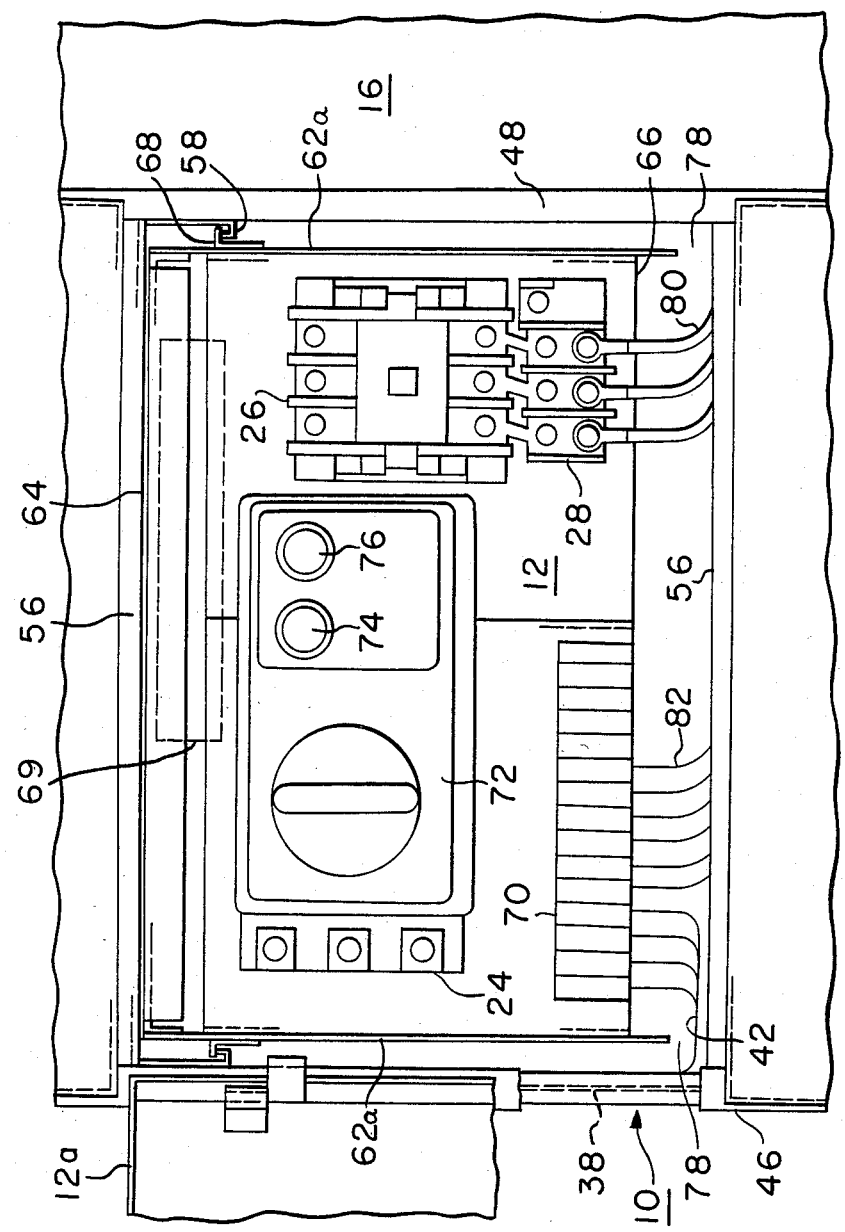
FIG. 5 is a front view of one of the control units with its door opened, shown in FIG. 4.

FIG. 4 is a cross sectional view of a practical embodiment of the control center 10 and FIG. 5 is a front view of the control unit 12 with its door opened which is held in the control center. In FIGS. 4 and 5, corner supports 46 stand at the four corners of the control center 10 and an intermediate support 48 is provided between the control unit section 14 and the vertical wiring section 16. Further, the vertical wiring section 16 and a vertical bus conductor section 50 are separated by a vertical supporting frame 52 and these supports 46 and 48 and the vertical supporting frame 52 are connected by horizontal frames 54 at their upper and lower ends as shown in FIG. 4. Guide rails 58 are formed at both sides of a partition plate 56 for partitioning a space for control units 12 in the vertical direction. Three vertical bus conductors 60 for three phases each having a substantially Z shape in cross section are secured in the vertical supporting frame 52 through an insulating supporting device (not shown in the drawing).

Description will be made as to the construction of a typical control unit 12. The reference numeral 62 designates a U-shaped unit case, the numeral 64 refers to a front crossing member serving as a drawing knob, on which a latch device (not shown) may be placed. The numeral 66 designates a fitting plate which divides the interior of the unit case into the front and rear portions and the numeral 68 designate fitting rails provided on the outer surface of both side plates 62a of the unit case. A connector 69 to be connected to the vertical bus conductors 60 is positioned at the rear of the fitting plate 66. On the front surface of the fitting plate 66, the line disconnecting device 24, the electromagnetic switch 26, the thermal relay 28 as described before and a terminal block 70 are attached. On a door 12a of the control unit 12, there are attached an operating handle device 72 for operating the line disconnecting device 24 from the outside and push buttons 74, 76. Further, from the vertical wiring section 16 through a gap 78 formed between the side plates 62a of the unit case and the partition plate 56 and below the side plates, cables 80 for the main circuit extend and are connected to the thermal relay 28 and cables 82 for the control circuit extend and are connected to the terminal block 70. The vertical control bus device 38 is arranged at a position opposite pulling-in side for the cables 80 and 82, namely at the left side of the control unit 12 in FIGS. 4 and 5 and branch lines 42 extend from the vertical control bus device 38 to the terminal block 70 through the gap 78 formed between the side plates 62a and the partition plate 56. The vertical control bus device 38 is formed thin in its general configuration and is arranged at the near side of one of the corner supports 46.

Figure 6:
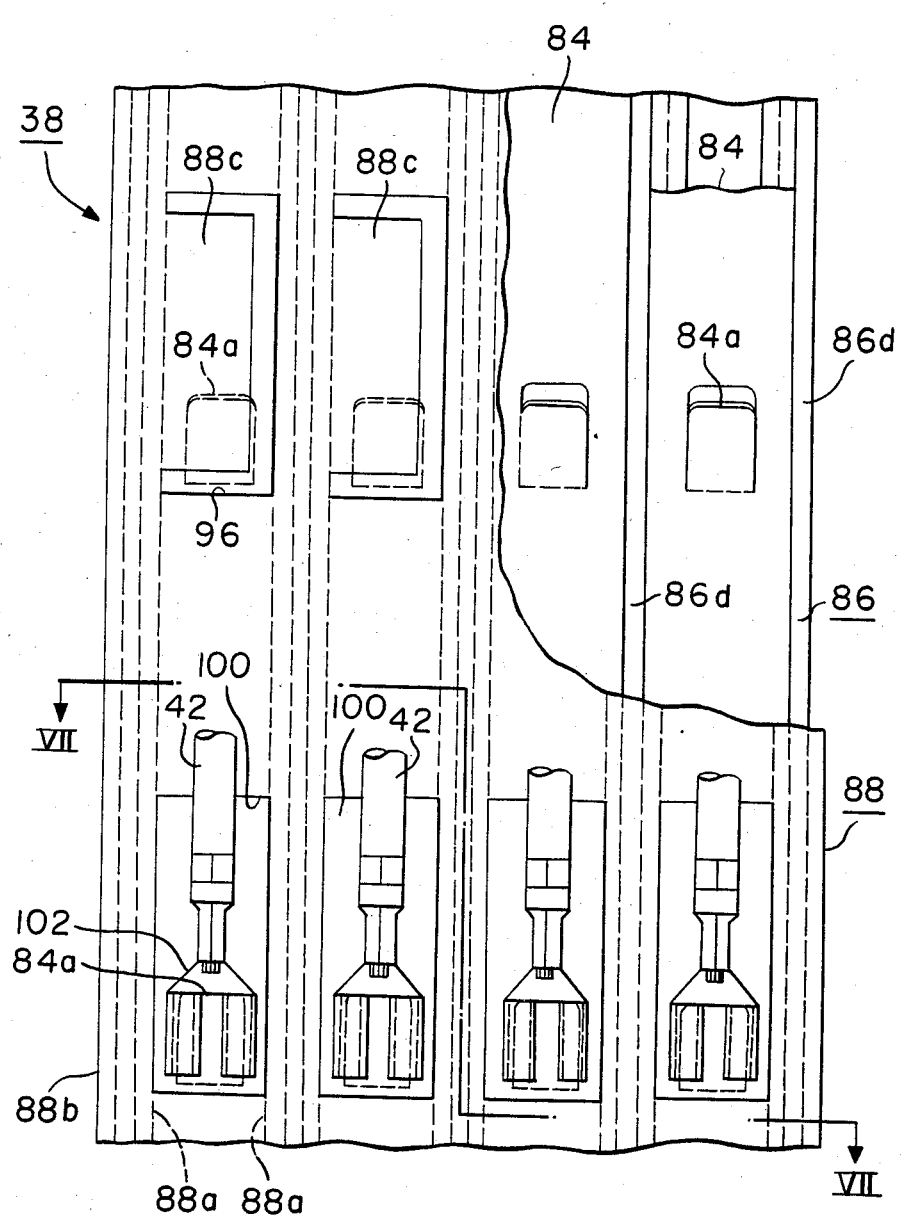
FIG. 6 is a front view of an embodiment of the control bus device according to the present invention.
Figure 7:
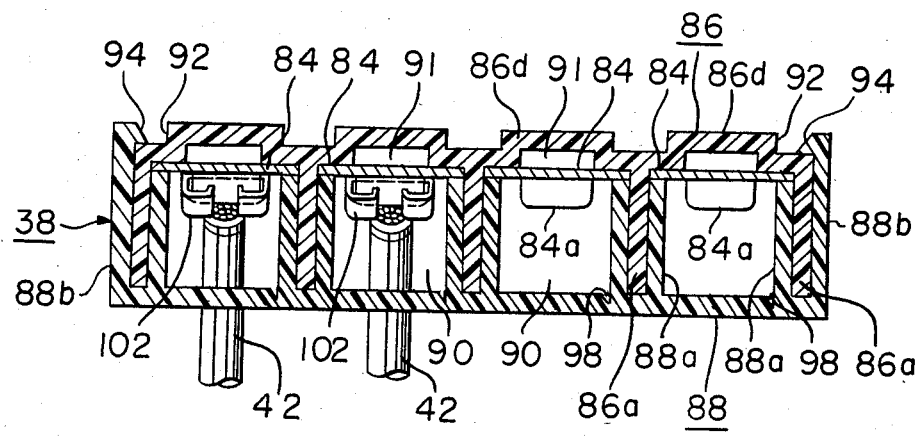
FIG. 7 is a cross sectional view taken along the line VII—VII in FIG. 6.

FIG. 6 is a front view showing one embodiment of the vertical control bus device 38 as described above and FIG. 7 is a cross sectional view taken along the line VII—VII in FIG. 6. The vertical control bus device 38 comprises a plurality of electrically conducting bars 84 in a rectangular shape in cross section and first and second insulating cases 86, 88 made of an electrically insulating material such as synthetic resin which hold a plurality of conducting bars in laterally aligned condition.

In each of the conducting bars 84, a tab 84a for snap-on terminal, which is used for the connecting point 40 in FIG. 3, is formed by cutting and raising operations. The first and second insulating cases 86, 88 are fitting into each other in the longitudinal direction. The first insulating case 86 is provided with a plurality of grooves 90 having a substantially square shape in cross section for receiving the conducting bars 84 respectively. A part of the bottom portion of each of the grooves 90 projects outward so that a recessed portion 91 is formed between the bottom surface 86d the conducting bar 84. Side surfaces 86a extending at the both sides of the each of the grooves 90 serve as insulating barriers and have the height so that the insulative properties of the insulation between the conducting bars placed in parallel and adjacent each other is sufficiently maintained. Stepped portions 92 are formed at both side ends at the bottom of the first insulating case 86. On the other hand, the second insulating case 88 is provided with a plurality of legs 88a which are formed in such a manner that when the second insulating case 88 is fitted to the first insulating case 86 with their openings opposed so as to cover the opening of the grooves 90, the legs 88a second insulating case are inserted along the side walls 86a grooves 90 to reach the respective conducting bars 84. At the both ends of the second insulating case 88, there are formed a pair of engaging legs 88b with engaging hooks 94 at their free ends which engage with the stepped portions 92 of the first insulating case 86 due to their own elasticity. It is possible to provide a connecting means consisting of the stepped portion 92 and the engaging hook 94 between either or both sides of side walls 86a grooves 90 and either or both the legs 88a.

By coupling the first and second insulating cases 86, 88 together, both edges in the width direction of each of the conducting bars 84 are pushed and secured between the inner bottom surface of the groove 90 and the free ends of the legs 88a. In this case, it is necessary to arrange the tab 84a of the conducting bar 84 to face a punched groove 96 having a substantially U-shape which is formed in the second insulating case. Both edges of the punched groove 96 are communicated with a notch 98 formed at the root portion of the leg 88a. By breaking and removing the inside portion 88C of the punched groove 96 by the aid of the notch 98, a drawing port 100 for the branch lines 42 can be formed. A receptacle 102 for snap-on terminal is fitted to the end of each of the branch lines 42. Thus, each of the branch line 42 can be snap-connected to the tab 84a through the drawing port 100.

When the control bus device of the present invention constructed as above-mentioned is applied to a control center and so forth, the following remarkable effects can be obtained.

(A) Assembling operations for the control bus device can be easy because the first and second insulating cases 86, 88 are combined by fitting them each other and the conducting bars 84 are secured inside the cases at the same time of the assembling operation.

(B) Electrically insulative property is high because the conducting bars 84 are held in the first and second insulating cases 86, 88 with the result of capable of close arrangement of the conducting bars and it is effective to miniaturize the control center because the control bus device can be provided on or near the casing of the control center or parts made of metallic plate for the control units placed in the control center.

(C) The thickness of the control bus device 38 can be reduced because the connecting points 40 for branch lines are constituted by tabs 84a formed by cutting and raising the conducting bars.

(D) The drawing port 100 for branch lines can be provided by breaking and removing the inside part of the U-shaped punched groove 96, if desired, to allow easy snap-on connection of the branch line 42.

Figure 8:
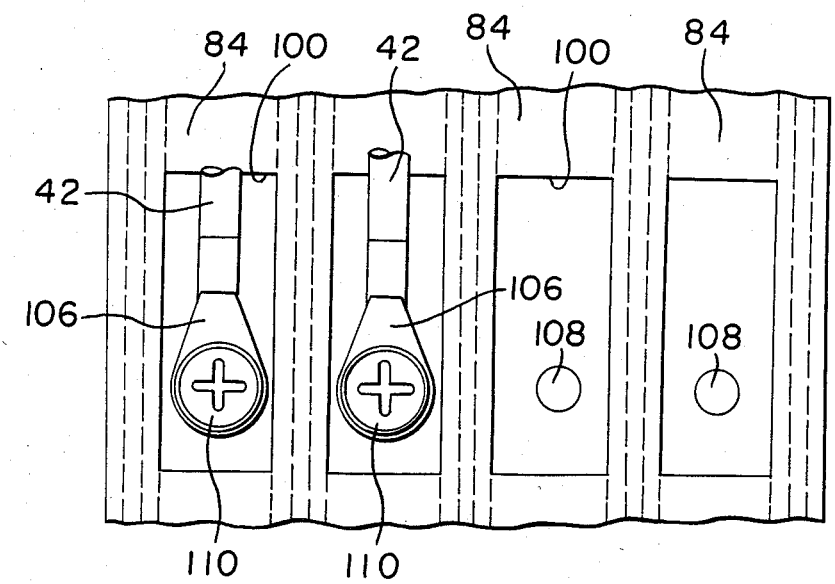
FIG. 8 is a front view similar to FIG. 6 of a modified embodiment of the control bus device of the present invention.

In the embodiment described above, the tabs 84a are formed integrally with the conducting bars 84. It is, however, possible to form a threaded hole 108 for a circular crimp-type terminal 106 instead of the tab 84a as shown in FIG. 8. In this case, the depth of the recessed portion 91 is more or less greater than that of the control bus device shown in FIG. 7 because the recessed portion 91 receives the top of a fastening screw 110 of the circular crimp-type terminal 106 even though the same effect as the foregoing embodiment can be attained.

What is claimed is:

1. A control bus device in a casing containing a plurality of control units arranged in a tier, forming a control center, said control bus device comprising:
   conducting bars;
   a plurality of connecting means mounted on said conducting bars at predetermined locations;
   branch lines connecting said control units and said conducting bars through said connecting means;
   an insulating case receiving said conducting bars including a first insulator and a second insulator;
   said first insulator having a base and sidewalls perpendicular to said base, said sidewalls being spaced apart a distance equal to the width of said conducting bars, forming compartments receiving said conducting bars parallel to and adjacent to said base so that adjacent conducting bars are insulated by said sidewalls;
   said second insulator having a base and sidewalls perpendicular to said base, said sidewalls being arranged in pairs with one pair being located at each position corresponding to the sidewalls of said first insulator; said pairs of sidewalls being spaced apart to matingly receive said sidewalls of said first insulator, so that the ends of said sidewalls of said second insulator distal from said base of said second insulator contact said conducting bars on a surface opposite the surface adjacent the base of said first insulator; and
   attaching means detachably connecting said first and second insulator to form said insulating case.

2. The control bus device according to claim 1, wherein said attaching means includes stepped portions formed in said base of said first insulator and hooks formed in the legs of said second insulator so that they are connected to and disconnected from each other.

3. The control bus device according to claim 1, wherein said attaching means includes an engaging leg formed integrally with said second insulator.

4. The control bus device according to claim 1, wherein each of said conducting bars is formed as a flat plate so that both edges of the conducting bar are frictionally held in place by the pressing force of said sidewalls of said second insulator.

5. The control bus device according to claim 1, wherein said connecting means is a tab for a snap-on terminal formed by cutting and raising said conducting bar.

6. The control bus device according to claim 1, wherein said connecting means is a threaded hole formed in said conducting bar receiving a terminal with a screw.

7. The control bus device according to claim 3, wherein said attaching means are engaging hooks formed at both sides of said second insulator which engage said base of said first insulator.

8. The control bus device according to claim 1, further comprising a notch formed in said second insulator at a position corresponding to said connecting means to facilitate forming of a drawing port for receiving a branch line.

* * * * *